Dec. 1, 1970  V. J. FOWLER ET AL  3,544,201

OPTICAL BEAM DEFLECTOR

Filed Jan. 2, 1968  2 Sheets-Sheet 1

INVENTORS.
VERNON J. FOWLER
JOHN SCHLAFER
WILLIAM R. WATSON

BY Joseph H. Roediger
ATTORNEY.

Dec. 1, 1970   V. J. FOWLER ET AL   3,544,201
OPTICAL BEAM DEFLECTOR
Filed Jan. 2, 1968   2 Sheets-Sheet 2

INVENTORS.
VERNON J. FOWLER
JOHN SCHLAFER
WILLIAM WATSON

BY *Joseph H. Roediger*
ATTORNEY.

United States Patent Office 3,544,201
Patented Dec. 1, 1970

3,544,201
OPTICAL BEAM DEFLECTOR
Vernon J. Fowler, East Meadow, John Schlafer, Flushing, and William R. Watson, College Point, N.Y., assignors to General Telephone and Electronics Laboratories Incorporated, a corporation of Delaware
Filed Jan. 2, 1968, Ser. No. 695,142
Int. Cl. G02f 1/34
U.S. Cl. 350—285                                    10 Claims

ABSTRACT OF THE DISCLOSURE

An optical beam deflector employing a plurality of piezoelectrically-driven deflecting elements is disclosed. Each individual deflecting element includes at least one piezoelectric transducer and an overlying reflector coupled thereto. The transducer which operates in the bending mode, is cantilevered from a rigid support so that the free end thereof can be displaced by an applied deflection signal. One edge of the overlying reflector is coupled to the free end of the transducer so that its center of gravity is located proximate to the midpoint of the transducer. Consequently, when the displacement of the free end of the transducer causes the reflector to rotate, the motion of the center of gravity of the reflector is minimized and the inertial loading of the transducer is reduced.

BACKGROUND OF THE INVENTION

This invention relates to optical beam deflectors of the type employed in optical tracking and acquisition systems and, in particular, to beam deflectors employing piezoelectrically-driven deflecting elements therein. The invention described herein was made in the performance of work under a NASA contract and is subject to the provisions of Section 305 of the National Aeronautics and Space Act of 1958, Public Law 85–568 (72 Stat. 435; 42 O.S.C. 2457).

Due to the development of the laser as a source of a highly collimated beam of radiation, considerable interest has been generated in the provision of optical beam deflectors for use in laser tracking and in scanning systems. Several different approaches to rapidly changing the direction of propagation of a beam of radiation have been utilized. In one type of device, variable reflectors in the form of rotating mirrors driven by electric motors provide the desired deflection. Alternatively, variable refraction systems have employed different types of electro-optic and magneto-optic crystals in which the index of refraction is made to vary in a controlled manner. In another method of providing the desired deflection, the beam is passed through a transparent bar in which intense sound waves have been established. The sound waves cause the material to act as a diffraction grating with the deflection of the beam being controlled by the frequency of the waves.

In practice, the controlled deflection of a light beam by reflection from an oscillating or tilting mirror has a number of advantages when compared with other modes of beam deflection. Among these advantages are that the deflector is essentially dispersionless, exhibits low optical losses, and can be used to deflect beams of radiation having frequencies ranging from the ultraviolet to the far infrared portions of the spectrum. However, the mechanical nature of a tilting mirror deflector has normally limited the operating frequency thereof to a relatively narrow band in the audio frequency range. This is due to the fact that mirror motion is severely attenuated when the frequency of the deflection signal exceeds the first mechanical resonance frequency of the deflector. This first or lowest mechanical resonance frequency is determined primarily by the mass of the mirror, the mass of the transducer and the system compliance. The compliance is a measure of the displacement of the mirror per unit of applied force.

The mass of the transducer and the system compliance are determined by the particular device used to produce the tilting of the mirrors. The mass of the mirror can be reduced for a given deflector and the bandwidth of deflection capability increased. However, one of the parameters characterizing the performance of a beam deflector is the product of the bandwidth and the resolution. The resolution of the deflector expresses the number of resolvable positions or spots that the deflected beam may assume in the far field. A reduction in the size of the mirror to increase the bandwidth results in a corresponding decrease in the resolution and thus, the product of bandwidth and resolution is not substantially improved.

In one type of variable reflection device, described in U.S. patent application Ser. No. 518,324, filed Dec. 30, 1965 in the name of Vernon J. Fowler and assigned to the same assignee as in the instant application, relatively wideband operation has been achieved by the use of mirrors attached to piezoelectric shear transducers. These transducers develop a shear strain in response to an electric field applied perpendicular to their poling direction. The induced shearing action causes the mirror to tilt through an angle proportional to the applied field. A multiple mirror structure with the individual mirrors disposed so that the beam follows a zig-zag pattern as it travels therethrough is employed to increase the total obtainable deflection angle. The relative sizes of the mechanical components govern the bandwidth by determining the mechanical resonance frequency of the mirror-transducer combination.

In a multiple mirror type of beam deflector, the light beam travels sequentially to a number of identical individual deflectors which are driven in synchronism to provide an increased resultant beam deflection angle. This technique is especially useful in the case of the piezoelectric shear-type deflectors wherein the individual deflectors are capable of only small-angle rotation or tilting. A typical peak to peak angular motion from a single shear-type mirror deflector is of the order 0.050°. Although a multiple mirror configuration provides a cumulative improvement in the obtainable deflection angle, the total number of mirrors can not be increased indefinitely since the input beam diameter must be reduced as the number of mirrors increases to prevent vignetting of the deflected beam by the edge of the last mirror. In practice, the reduction in resolution due to a small beam diameter outweighs the advantages of extra mirrors. Therefore, the optimum length of a multiple mirror structure to provide maximum resolution is related to the mirror size and the angular deflection of each mirror.

SUMMARY OF THE INVENTION

The present invention is directed to a high resolution beam deflector of the tilted mirror type which is capable of operation at frequencies up to several kilohertz.

The beam deflector contains a number of individual deflecting elements arranged in a configuration so that a beam of radiation passing therethrough successively impinges on the reflecting surfaces of the several elements. Each deflecting element includes transducer means and reflecting means coupled thereto. The application of a signal to the transducer means results in the tilting of the surface of the reflecting means and a change in the direction of the beam of radiation reflected therefrom.

The transducer means is characterized by the fact that it operates in the bender mode. Thus, the application of a deflection signal to the transducer results in a bending action thereof. One end portion of the transducer is attached to a support so that the opposing or unclamped end portion is free to move when the transducer is energized. The reflecting means is coupled to the unclamped end of the transducer and, therefore, the means is tilted when this unclamped end moves.

The reflecting means overlies and is spaced adjacent to the transducer. By mounting the reflecting means in an overlying relationship with the transducer, the center of gravity of the reflecting means is located proximate to the midpoint between the first and second ends of the transducer. This mode of construction is found to minimize the translational motion of the center of gravity of the reflecting means with respect to the axis about which the reflecting means rotates to provide the desired tilt when the transducer is energized and bends. In other words, the center of gravity of the reflecting means is located approximately on the axis of rotation about which the reflecting means is tilted. As a result, translational movement of the reflecting means during deflection operation does not contribute significantly to the inertial loading of the transducer.

Since the reflecting means is, in effect, cantilevered back over the transducer, the size or area of the surface of the means may be relatively large. For example, the area of the reflecting surface may be increased by extending the surface and the transducer outwardly in a direction parallel to the supported or clamped edge of the transducer without changing either the location of the center of gravity of the reflecting means relative to the midpoint of the transducer or the ratio of the masses of the reflecting means and the transducer. Consequently, the resolution of a two-dimensional beam deflector utilizing a plurality of individual deflectors can be increased without significantly changing the mechanical resonant frequency of the individual deflectors. In addition, the mounting of the reflecting surface in overlying relationship with the bending mode transducer in combination with the coupling of the edge of the reflecting means to the unclamped end of transducer reduces the inertial loading of the transducer and provides a deflector having a bandwidth capability of the order of kilohertz.

In a preferred embodiment of the invention, the transducer means associated with each individual deflector includes a plurality of bender-mode transducers. The transducers are adjacently spaced and each has its first end clamped to the support and its second end unclamped. The transducers are attached to the support so that the unclamped end of one transducer is next to the clamped end of the adjacent transducer. In addition, the transducers are energized in a manner which results in adjacent transducers bending in the opposite direction. When so energized, the transducers are found to share a common plane tangent to their unclamped ends. This common tangent plane passes essentially through the midpoints (when side-viewed) of the transducers.

A mirror is coupled to the second end of each transducer and, as a result, is supported at a number of places located near the opposing edges of the mirror. When coupled to the transducers in an overlying relationship, the mirror lies essentially in the common tangent plane of the transducers. As a result, the mirror is tilted about a centrally located rotation axis upon the application of the deflection signal to the transducers. This is due to the fact that adjacent transducers are coupled to opposing edges of the mirror and bend in an opposing manner when energized. The axis of rotation of the mirror is located near or passes through the center of gravity of the mirror so that the tilting or rotation about the axis does not result in a substantial translational movement of the center of gravity. Consequently, translational movement of the mirror does not significantly contribute to the inertial loading of the transducers during operation. As employed herein, the inertial loading of the transducer due to the movement of the mirror refers to the contribution to the opposition the individual deflector encounters when it experiences a change in velocity (i.e., undergoes acceleration). The opposition to a change in motion depends not only upon the mass of the object being moved but also upon its distance from the center of rotation. This opposition is expressed in terms of translational and rotational inertia. By mounting the reflecting surface so that its center of gravity is located essentially at its center of rotation, the contribution of the translational inertia to the total inertia is minimized and the operating bandwidth capability of the deflector is increased.

Further features and advantages of the invention will become more readily apparent from the following detailed description of a specific embodiment when viewed in conjunction with the accompanying drawings.

DESCRIPTION OF THE PREFERRED EMBODIMENTS

Figure 1:
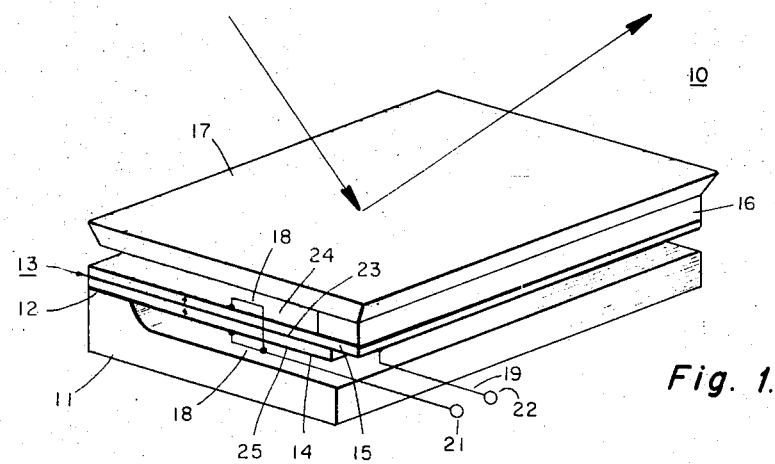
FIG. 1 is a view in perspective of one embodiment of the invention.

Referring now to FIG. 1, an individual beam deflector 10 is shown comprising a support member 11, a transducer 13 attached thereto, and a reflecting surface 17 coupled to the transducer by coupling means 16. A beam of radiation is depicted as being incident upon and reflected from surface 17. In operation, the application of a deflection signal to transducer 13 results in a change in direction of the reflected beam.

The transducer 13 operates in the bender mode when energized and is preferably a piezoelectric transducer. However, magnetostrictive or bimetallic transducers may be utilized for a particular application if desired. The piezoelectric transducer is comprised of first and second sheets 14 and 15 of piezoelectric material which are characterized by the fact that their length expands or contracts in accordance with their direction of poling and the polarity of a voltage applied thereacross. By bonding two length-expander piezoelectric sheets together and applying a voltage in the appropriate manner, the resulting motion is a bending action. This type of transducer is generally referred to as a bimorph bender and, if one end is clamped, considerable motion is produced on the free end.

As shown, one end of bimorph transducer 13 is affixed to raised portion 12 of support 11. The unclamped end is provided with coupling means 16, for reflecting surface 17. The individual sheets 14 and 15 of piezoelectric material comprising bimorph transducer 13 are shown in FIG. 1 to be of unequal length with the result that one sheet extends outwardly of the other at the unclamped end. This type of construction readily enables electrical contact to be made to an electrode interposed between the two sheets. Alternatively, the extension of the one sheet may be located at the clamped end if desired. It will be noted that deflection terminal 22 is coupled via lead 19 to the middle electrode 23. Terminal 21 is coupled via leads 18 to the outermost two electrodes 24 and 25 of the transducer.

The application of a deflection signal between terminals 21 and 22 results in the expansion of one sheet of piezoelectric material and the contraction of the other with a resultant displacement of the free end. In the embodiment of FIG. 1, the two sheets are poled in the same direction as shown by the arrows therein to provide the bending action. When energized, the direction of movement of the free end depends upon the polarity of the applied deflection signal. In applications wherein the transducer is required to move in only one direction, the support member 11 need not have a raised portion to provide clearance for movement toward the support.

The coupling means 16 serves not only to couple reflecting surface 17 to the free end of the transducer but also provides clearance to enable the surface to be tilted in either direction. The coupling means insures that the edge of the reflecting surfaces moves in response to the movement of the free end of the transducer. The reflecting surface 17, typically a fused silica plate having a dielectric reflecting coating thereon, is positioned in the path of an incident beam of radiation with the beam being reflected therefrom. As the transducer bends in accordance with the applied deflection signal, the reflecting surface tilts so that the direction of the reflected beam is changed.

Figure 2:
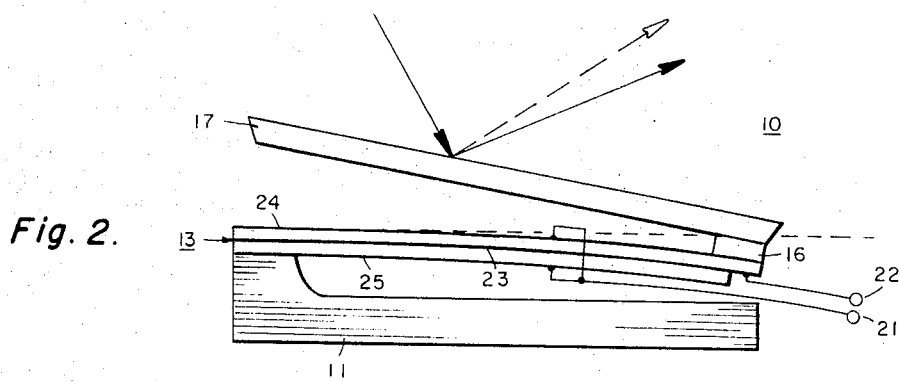
FIG. 2 is a side-view of the embodiment of FIG. 1.
Figure 3:
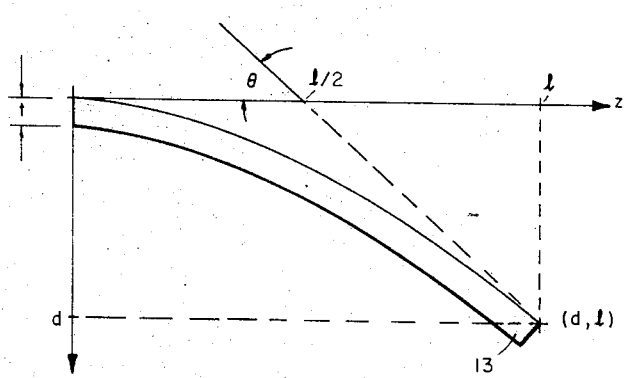
FIG. 3 is a diagram illustrating the deflection of a bender-mode transducer.

The operation of the individual deflector 10 is shown in greater detail in FIGS. 2 and 3. Referring now to FIG. 2, the polarity of the deflection signal applied between terminals 21 and 22 is such that the free end of the cantilevered transducer moves downwardly from the no applied signal position, shown by the dotted line, toward the support member 11. Due to the displacement of the free end of the transducer, the reflecting surface 17 is tilted as shown so the direction of the reflected beam is changed. If the polarity of the applied signal is reversed, the surface 17 rotates in the opposite direction and the reflected beam is deflected to a position on the other side of the no-applied signal position shown by the dotted line.

In normal operation, the usable bandwidth for the deflector is limited by the first mechanical resonance frequency of the structure. This frequency is determined primarily by the mass of the transducer, the system compliance and the mass of the reflecting surface. Since the characteristics of the transducer determine its mass and, for the most part, the system compliance, the location of the reflecting surface mass is determinative of the lowest mechanical resonance frequency in a given device. While the reflecting surface mass may be reduced by a reduction in the reflecting area thereof, the resolution of a deflector is a function of the size of the reflecting surface. An analysis of the effect of reflector size on resolution is contained in an article entitled "A Survey of Laser Beam Deflection Techniques," by V. J. Fowler and J. Schlafer appearing in Applied Optics, vol. 5, pages 1675, October 1966. Since the bandwidth-resolution product is characteristic of the deflector's performance, the reduction in reflector size provides little net gain in this performance characteristic.

Referring now to FIG. 2, the surface 17 is coupled along one edge to the unclamped or free end of transducer 13 so that it is cantilevered back over the transducer. In other words, the reflecting surface is mounted in an overlying relationship with respect to the transducer. By so mounting the surface, the contribution of the translational inertia of the surface to the loading of the cantilevered transduced is minimized. This is due to the fact that the center of gravity of the surface is located essentially at the center of rotation thereof and, thus, the translation of the center of gravity is minimized.

The minimization of the translational inertia of the reflecting surface in the present invention is described in connection with the diagram of FIG. 3 wherein the bender-mode transducer is energized so that its free end is displaced by a distance $d$ from its rest position. The transducer is characterized by having a length $l$ and a thickness $t$. Since the bending takes place continuously along the transducer length, a tangent to the transducer at any point forms an angle with the z-axis which is proportional to the distance from the support. The line drawn tangent to the transducer at the point $(d, l)$ and forming the deflection angle $\theta$ with the z-axis is noted to intersect the z-axis at essentially $l/2$ for all positive and negative curvatures. Thus, this point of intersection can be regarded as fixed at the midpoint of the transducer throughout the entire dynamic deflection range. By mounting reflection surface so that its center of gravity is at or near this point, the motion of the center of gravity is negligible during operation and the translation of the reflecting surface does not significantly contribute to the inertial loading of the transducer. In the present deflector, the reflecting surface is cantilevered back over the transducer so that its motion approximates that of the tangent shown in FIG. 3. It shall be noted in FIG. 2, however, that the coupling means 16, which serves as a spacer between the unclamped end of the transducer and the reflecting surface, contributes to the offset of the center of gravity from the true center of rotation. In practice, this spacing is relatively small and may be neglected.

Figure 4A:
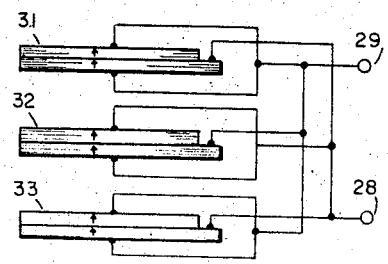
FIG. 4a is a schematic diagram showing the electrical connections for the embodiment of FIG. 1.
Figure 4:
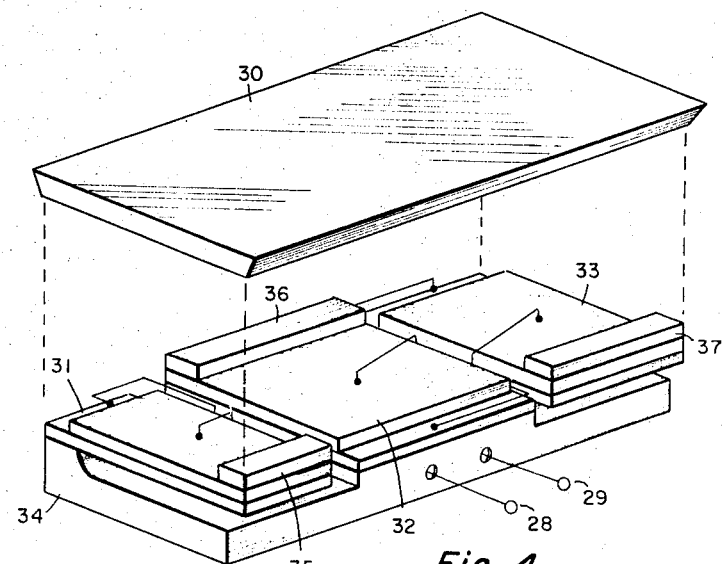
FIG. 4 is an exploded view of a second embodiment of the invention.

A second embodiment of the invention is shown in FIG. 4, wherein the reflecting surface 30 is coupled to three interlaced opposing transducers 31, 32 and 33. Each of the individual transducers is a bender-mode bimorph piezoelectric transducer similar to the transducer shown in FIGS. 1 and 2. The transducers 31, 32 and 33 are adjacently spaced and each has one end clamped to a raised portion of support 34. The transducers are interlaced so that the unclamped end of one transducer is next to the clamped end of the adjacent transducer. In addition, adjacent transducers operate in the opposing manner so that as one bends in one direction the adjacent transducer bends in the opposite direction. The three transducers share a common tangent plane which is essentially parallel to the plane of the surface. This is due to the fact that the tangents to the individual transducers intersect the z-axis at the midpoint between the first and second ends of the transducers. By locating the center of gravity of the reflecting surface proximate to the line formed by the midpoints of the transducers, the translational inertia of the reflecting surfaces is minimized. In addition, the formation of a common tangent plane by the transducers essentially eliminates strain in the reflecting surface. The opposing operation can be provided by energizing adjacent transducers with opposite polarity voltages or by reversing the direction of poling of adjacent transducers.

Each transducer has a coupling means 35, 36, 37 mounted on its free end for attachment to the reflecting surface 30. Since the surface is supported on its opposing edges by the plurality of coupling means, the deflector is structurally rigid and the forces which produce the tilt of the reflecting surface are distributed more symmetrically than in embodiments utilizing a single transducer.

When a deflection voltage is applied between terminals 28 and 29, transducers 31 and 33 bend in the same direction thereby forcing the corresponding edge of the reflecting surface to also move in this direction. However, transducer 32 bends in the opposite direction and forces the edge of the surface coupled to its free end to move accordingly. As a result, the reflecting surface is tilted with the direction of rotation being determined by the polarity of the applied deflector voltage. The connections between the electrodes of the transducers and terminals 28 and 29 for the poling directions indicated by the arrows is shown schematically in FIG. 4a. While three transducers are shown in the embodiment of FIG. 4 it shall be noted that additional transducers may be utilized if desired.

Figure 5:
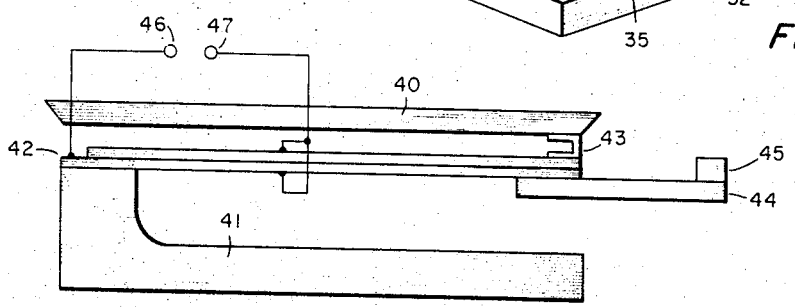
FIG. 5 is a side view of a third embodiment of the invention.

Another embodiment of the invention is shown in the side-view of FIG. 5 wherein transducer 42 is attached to support 41. The coupling means located at the free end of transducer 42 comprises a spring-clip member 43 upon which reflecting surface 40 is mounted at one end. The coupling means in this embodiment is a flexible anisotropic member in that the member transmits the desired deflection force while being compliant in other directions. The use of the anisotropic coupling means provides protection from the effects of differential thermal expansion between the reflecting surface and the transducer materials. In the case of an embodiment utilizing a plurality of transducers, it has been found helpful in the manufacture of the deflector to utilize a solid spacer bar as one of the couplers to initially locate the reflecting surface. The other transducers are provided with anisotropic couplers which are then attached to the reflecting surface.

Further, in applications wherein wideband deflection signals are likely to be applied to the deflector, or, if it is to be subjected to mechanical shock or vibration, it has been found desirable to damp out the effects of the first mechanical resonance frequency whereby a relatively smooth frequency response is obtained and the mirror excursion is limited. Accordingly, the embodiment of FIG. 5 is shown provided with damping means coupled to the free end of transducer 42. The damping means which is a tuned element comprising a bar of damping material 44 and a mass block 45 mounted at the end thereof. The damping means is a cantilevered beam which is tuned to a resonance frequency which is approximately the same as the first mechanical resonant frequency of the deflector. However, the damping means does not materially alter the low frequency deflection characteristics but, in effect, lowers the resonant Q of the device.

Figure 6:
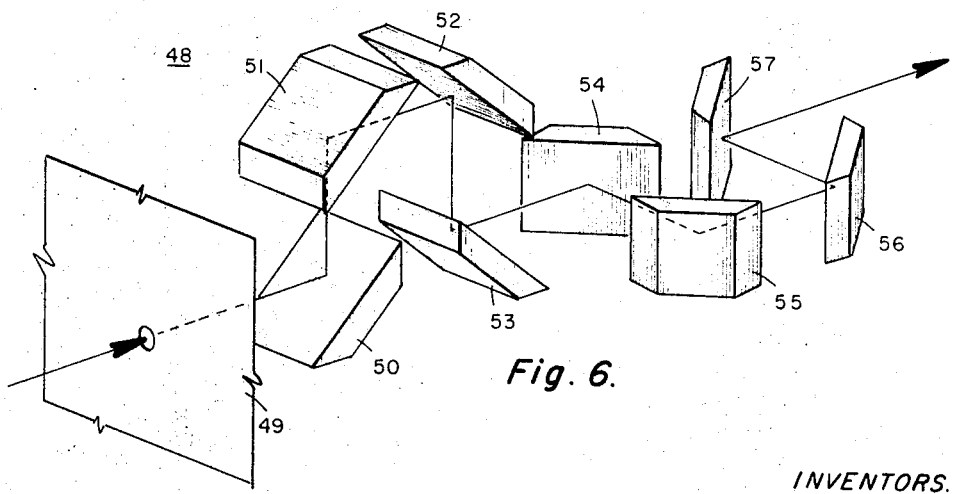
FIG. 6 is a view in partial section of an embodiment of the invention wherein a plurality of deflectors are utilized to provide two-dimensional deflection.

Referring now to FIG. 6, a two-dimensional beam deflector 48 is shown comprising housing 49 having apertured end plates and individual beam deflectors 50 through 57. The path of the beam of radiation is shown as it undergoes multiple reflections in passing through the housing. Deflectors 50 through 53 provide deflection in one direction while deflectors 54 through 57 provide deflection in the orthogonal direction. In this deflector, the capability of increasing the size of the reflecting surface by extending the surface and transducer in a direction parallel to the clamped edge of the transducer permits the resolution of the deflector to be increased without significantly lowering the mechanical resonance frequency. Since deflectors 50 through 53 cause the beam to sweep across deflectors 54 through 57 in a direction parallel to the clamped edge of the associated transducers, increasing the size of the surfaces of deflectors 54 through 57 increases the maximum deflection angle of deflectors 50 through 53 and provides improved resolution.

In one embodiment of a two-dimensional deflector tested and operated, each of the eight individual deflectors were of the three transducer type. The transducers were fabricated from PZT-4, a piezoelectric ceramic commercially available from the Clevite Corp. Each transducer was a sandwich of similarly poled 0.020 inch thick sheets electroded on both sides with evaporated nickel. The two outside transducers were ⅜ inch wide while the inner transducer was ¾ inch wide. The dimensions of the reflecting surfaces were 1.5 x 2.0 x 0.234 inches. The surface contained a flat multilayer dielectric coating.

Each individual deflector deflects a beam through ±50 arc minutes which corresponds to a resolution of ±510 spots for a 6328 A. light beam incident at 45°. The first mechanical resonance frequency was found to be 300 Hz. In the two-dimensioned device shown, the deflection angles for each dimension were ±3.3° and the resolution for each dimension was ±1400 spots. The applied deflection voltage was ±450 volts.

While the above description has referred to specific embodiments of the invention, it will be recognized that many variations and modifications could be made therein without departing from the spirit and scope of the invention.

We claim:
1. Apparatus for deflecting a beam of radiation in accordance with an applied deflection signal comprising:
 (a) support means;
 (b) transducer means having a first portion secured to said support means and a second unclamped portion free to bend in response to a deflection signal applied to said transducer means, the movement of the second portion of said transducer means being determined by said deflection signal; and
 (c) reflecting means coupled to the second portion of said transducer in overlying relation thereto, said reflecting means being displaced about an axis of rotation located approximately on its center of gravity by movement of said transducer means, the position of said reflecting means with respect to an incident beam of radiation being varied in accordance with the deflection signal applied to said transducer means without significantly increasing the inertial loading of said transducer means.

2. Apparatus in accordance with claim 1 wherein said transducer means has a midpoint located midway between the portions secured to said support means and said reflecting means and wherein the center of gravity of said reflecting means is located proximate said midpoint.

3. Apparatus for deflecting a beam of radiation in accordance with an applied deflection signal comprsing:
 (a) a support member;
 (b) a plurality of transducers having first and second ends, the first end of each transducer being clamped to said support member, said transducers being adjacently spaced with the first end of each transducer being positioned next to the second end of the adjacent transducer, said transducers bending in response to an applied deflection signal to form a common plane tangent to the second ends of said transducers; and
 (c) reflecting means overlying said transducers, said reflecting means being coupled to the second ends of said transducers whereby the position of said reflecting means with respect to an incident beam of radiation is varied in accordance with the deflection signal.

4. Apparatus in accordance with claim 3 wherein the center of gravity of said reflecting means is located proximate to the midpoint between the first and second ends of said transducers.

5. Apparatus in accordance with claim 4 wherein the coupling means is interposed between the second end of each transducer and the adjacent edge of the reflecting means, said reflecting means having opposing edges coupled to said transducers.

6. Apparatus in accordance with claim 5 wherein said coupling means comprises at least one isotropic coupling means interposed between the second end of one of said transducers and the adjacent edge of said reflecting means.

7. Apparatus in accordance with claim 6 further comprising damping means coupled to the second end of one of said transducers, said damping means being tuned to a resonance frequency which is approximately the same as the first mechanical resonance frequency of the transducers and the reflecting means.

8. A beam deflector comprising:
 (a) a support member;
 (b) a plurality of transducers having first and second ends, the first end of each of said transducers being clamped to said support member, said transducers being adjacently spaced with the first end of each transducer being positioned next to the second end of the adjacent transducer, said transducers bending in response to an applied deflection signal;
 (c) means for applying a deflection signal to said transducers whereby adjacent transducers bend in opposing directions;
 (d) reflecting means overlying said plurality of transducers;
 (e) a plurality of couplers each of which is interposed between the second end of a transducer and the overlying reflecting means, said couplers maintaining said reflecting means and said second ends in spaced relationship whereby said reflecting means is tilted about an axis in response to the deflection signal.

9. The beam deflector of claim 8 wherein the center of gravity of said reflecting means is located proximate to the axis about which said reflecting means is tilted.

10. Apparatus for deflecting an incident beam of radiation in two dimensions in accordance with an applied deflection signal which includes first and second deflectors oriented to provide deflection in orthogonal directions, said first deflector comprising:
(a) a support member;
(b) a plurality of transducers having first and second ends, the first end of each of said transducers being clamped to said support member, said transducers being adjacently spaced with the first end of each transducer being positioned next to the second end of the adjacent transducer, said transducers bending in response to an applied deflection signal;
(c) means for applying a deflection signal to said transducers whereby adjacent transducers bend in opposing directions;
(d) reflecting means overlying said plurality of transducers and positioned in the path of said incident beam;
(e) a plurality of couplers each of which is interposed between the second end of a transducer and the overlying reflecting means, said couplers maintaining said reflecting means and said second ends in spaced relationship whereby said reflecting means is tilted about an axis in response to the deflection signal and the incident beam is deflected in a first direction, and said second deflector comprising:
(f) a support member;
(g) a plurality of transducers having first and second ends, the first end of each of said transducers being clamped to said support member, said transducers being adjacently spaced with the first end of each transducer being positioned next to the second end of the adjacent transducer, said transducers bending in response to an applied deflection signal;
(h) means for applying a deflection signal to said transducers whereby adjacent transducers bend in opposing directions;
(i) reflecting means overlying said plurality of transducers and positioned in the path of the beam emerging from the first deflector;
(j) a plurality of couplers each of which is interposed between the second end of a transducer and the overlying reflecting means, said couplers maintaining said reflecting means and said second ends in spaced relationship whereby said reflecting means is tilted about an axis in response to the deflection signal and the beam is deflected in a second direction orthogonal to said first direction.

References Cited

UNITED STATES PATENTS

| | | | |
|---|---|---|---|
| 1,760,198 | 5/1930 | Hough | 178—7.6 |
| 2,012,797 | 8/1935 | Whitman | 178—7.3 |
| 2,137,188 | 11/1938 | Whitman | 350—269 |
| 2,746,352 | 5/1956 | Estey | 350—285 |
| 2,758,499 | 8/1956 | Ulrich | 350—285 |
| 2,920,529 | 1/1960 | Blythe | 350—285 |
| 3,110,824 | 11/1963 | Flanagan | 350—269 |
| 3,347,615 | 10/1967 | Staunton | 350—269 |
| 3,349,174 | 10/1967 | Warschauer | 178—7.6 |

FOREIGN PATENTS

| | | | |
|---|---|---|---|
| 601,732 | 1926 | France | 178—7.3 |

RONALD L. WIBERT, Primary Examiner

J. ROTHENBERG, Assistant Examiner